United States Patent Office 3,143,543
Patented Aug. 4, 1964

3,143,543
Δ¹ AND Δ¹,⁴ 12a-AZA-3,12-DIOXO-C-HOMO STEROIDS
Robert H. Mazur, Deerfield, Ill., assignor to G. D. Searle & Co., Chicago, Ill., a corporation of Delaware
No Drawing. Filed Jan. 8, 1962, Ser. No. 165,018
6 Claims. (Cl. 260—239.3)

This invention relates to Δ¹ and Δ¹,⁴ 12a-aza-3,12-dioxo-C-homo steroids and processes for the manufacture thereof. More particularly, this invention relates to new and useful chemical compounds of the formula

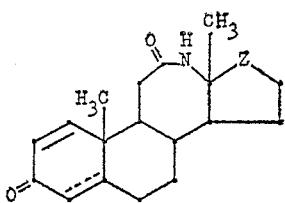

wherein Z represents a hydroxymethylene or alkanoyloxymethylene radical, or a radical of the formula

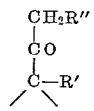

in which R' and R'' represent hydrogen or a hydroxy or alkanoyloxy radical. The dotted line signifies the optional presence of a 4,5 double bond.

Configuration at carbon atom 17 is ordinarily such that a ketonic and/or sole substituent of the methylene radical involved is in beta spatial arrangement, though the opposite configurations are also contemplated.

The alkanoyloxy constituents of the alkanoyloxymethylene radicals represented by Z, as also the alkanoyloxy radicals represented by R' and R'', are preferably of lower order, and, accordingly, have the formula —O—CO—lower alkyl wherein "lower alkyl" comprehends methyl, ethyl, propyl, isopropyl, butyl, isobutyl, sec-butyl, tert-butyl, pentyl, neopentyl, hexyl, isohexyl, heptyl, and like saturated, monovalent, acyclic, straight- or branched-chain, hydrocarbon groupings of the formula

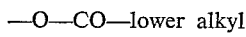

in which $n$ represents a positive integer less than 8.

The compounds to which this invention relates are useful because of their valuable pharmacological properties. Thus, for example, they are anti-biotic agents adapted to inhibit cotyledenous seed germination and the growth of algae such as *Chlorella vulgaris*; and, further, they are anti-inflammatory agents effective in counteracting the heat, swelling, and rubor characteristic of the inflammatory response to tissue insult.

Preparation of the compounds hereof having the formula

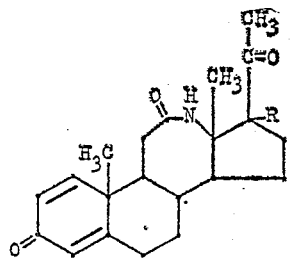

wherein R represents hydrogen or a hydroxy radical proceeds by fermenting the appropriate corresponding 1,2,4,5-tetrahydro-3β-hydroxy-5α compound or 3β-alkanoate thereof with a species of Nocardia adapted to the desired dehydrogenation, A.T.C.C. 14558 being used where R in the formula for the starting material represents hydrogen and A.T.C.C. 14559 where R represents a hydroxy radical. As an exception to the foregoing procedure, use of 3β - acetoxy - 12a - aza - C - homo - 5α - pregnane - 12,20-dione as the starting material and Arthrobacter sp. A.T.C.C. 14560 as the fermenting organism gives rise to the corresponding Δ¹-3-oxo product.

Fermentations are carried out in a suitably nutritive medium preliminarily inoculated with the apposite culture and maintained at about 25° with agitation under aerobic conditions conducive to the development of submerged growth. The starting material to be dehydrogenated is preferably added to the flourishing culture in solution—for example, in acetone or propylene glycol—whereupon the fermentation is continued as before until such time as the dehydrogenation is substantially complete—representatively, after upwards of 12 hours. The fermentation medium is then extracted with an appropriate solvent, such as dichloromethane, and the desired product obtained as the residue following vacuum distillation.

From 12a-aza-C-homopregna-1,4-diene-3,12,20-trione, on cold contact with pertrifluoroacetic acid in a mixture of trifluoroacetic acid and dichloromethane, is obtained 17β - acetoxy - 12a - aza - C - homoandrosta - 1,4 - diene-3,12-dione wherein the 17-acetoxy group is hydrolyzed by heating in aqueous methanolic potassium bicarbonate and the 17-ol which eventuates can be esterified ad libitum by heating with a tertiary amine base and an alkanoic acid chloride.

From 12a-aza-17α-hydroxy-C-homopregna-1,4-diene-3,12,20-trione, on contact with calcium hypoiodite in the presence of azobisisobutyronitrile as a radical initiator and with tetrahydrofuran and methanol as solvents, followed by heating with acetonic alkanoic acid in the presence of triethylamine as an acid acceptor, there eventuates 21-alkanoyloxy - 12a - aza-17α-hydroxy-C-homopregna-1,4-diene-3,12,20-trione. Saponification with methanolic sodium methoxide under nitrogen affords the corresponding 21-hydroxy compound which, in turn, is converted to the 17a,21-dialkanoate ester with alkanoic acid anhydride in an alkanoic acid catalyzed by p-toluenesulfonic acid under nitrogen.

The following examples describe in detail compounds illustrative of the present invention and methods whereby these compounds can be prepared. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials are in parts by weight, except as otherwise noted. Specific rotations are referred to the D line of sodium.

EXAMPLE 1

*12a-aza-C-homopregna-1,4-diene-3,12,20-trione.*—To a medium consisting of 75 parts of commercial beef extract, 125 parts of commercial peptone, 25,000 parts of tap water, and 10 parts of a silicone anti-foaming agent mixed in a stainless steel fermentor, sterilized by the addition of live steam under pressure to a temperature in the range 110–120° and a final volume of about 30,000 parts, and cooled to 25°, is added 2000 parts of a medium consisting of 6 parts of commercial beef extract, 10 parts of commercial peptone, and 2000 parts of distilled water preliminarily sterilized by heating to a temperature in the range 110–120° for 1 hour and then, consecutively, cooled, inoculated with a culture of Nocardia sp. A.T.C.C. 14558 and incubated for about 72 hours at a temperature of about 25°. The resultant mixture is maintained at about 25° for approximately 30 hours, during which time a stream of sterile air is passed through at a rate of about 10,000 parts by volume per minute and the developing culture is agitated to produce submerged growth. A solution of 10 parts of 12a-aza-3β-hydroxy-C-homo-5α-pregnane-12,20-dione (U.S. 2,806,029) in a mixture of 200 parts of acetone and 50 parts of methanol is then introduced, whereupon agitation with aeration at about 25° is resumed for 14 hours, at the end of which time the mixture is extracted with dichloromethane. The dichloromethane extract is stripped of solvent by vacuum distillation, and the residue is crystallized from a mixture of 88 parts of benzene and 78 parts of cylohexane. Recrystallization from approximately 4 volumes of benzene affords 12a-aza-C-homopregna-1,4-diene-3,12,20-trione melting at 183–185° and having a specific rotation of +48° at a temperature of 26° in a concentration of 1% in methanol solution. The product, being polymorphic, is alternatively obtained in a crystalline form melting at 200–203°. The product has the formula

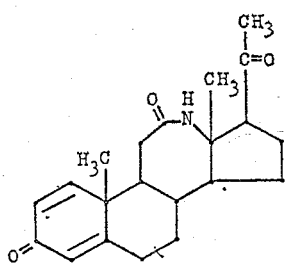

EXAMPLE 2

*12a-aza-C-homo-5α-pregn-1-ene-3,12,20-trione.*—To a medium consisting of 75 parts of commercial beef extract, 125 parts of commercial peptone, 25,000 parts of tap water, and 10 parts of a silicone anti-foaming agent mixed in a stainless steel fermentor, sterilized by the addition of live steam under pressure to a temperature in the range 110–120° and a final volume of about 30,000 parts, and cooled to 25°, is added 2000 parts of a medium consisting of 6 parts of commercial beef extract, 10 parts of commercial peptone, and 2000 parts of distilled water preliminarily sterilized by heating to a temperature in the range 110–120° for 1 hour and then, consecutively, cooled, inoculated with a culture of Arthrobacter sp. A.T.C.C. 14560, and incubated for about 72 hours at a temperature of about 25°. The resultant mixture is maintained at about 25° for approximately 25 hours, during which time a stream of sterile air is passed through at a rate of about 10,000 parts by volume per minute and the developing culture is agitated to produce submerged growth. A solution of 10 parts of 3β-acetoxy-12a-aza-C-homo-5α-pregnane-12,20-dione (U.S. 2,806,029) in 250 parts of acetone is then introduced, whereupon agitation with aeration at about 25° is resumed for 21 hours, at the end of which time the mixture is extracted with dichloromethane. The dichloromethane extract is stripped of solvent by vacuum distillation; and the residue is chromatographed on silica gel, using benzene and ethyl acetate in increasing proportions of the latter as developing solvent. From an eluate comprising solely ethyl acetate as the solvent there is obtained, on distillation of the ethyl acetate, a residue which, crystallized from a mixture of benzene and cyclohexane, affords 12a-aza-C-homo-5α-pregn-1-ene-3,12,20-trione melting at 201–204° and having a specific rotation of +32° at a temperature of 26° and a concentration of 1% in methanol solution. The product has the formula

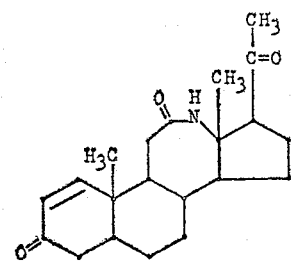

EXAMPLE 3

*12a-aza-17α-hydroxy - C - homopregna-1,4-diene-3,12,20-trione.*—To a medium consisting of 75 parts of commercial beef extract, 125 parts of commercial peptone, 25,000 parts of tap water, and 10 parts of a silicone anti-foaming agent mixed in a stainless steel fermentor, sterilized by the addition of live steam under pressure to a temperature in the range 110–120° and a final volume of about 30,000 parts, and cooled to 25°, is added 2000 parts of a medium consisting of 6 parts of commercial beef extract, 10 parts of commercial peptone, and 2000 parts of distilled water, preliminarily sterilized by heating to a temperature in the range 110–120° for 1 hour and then, consecutively, cooled, inoculated with a culture of Nocardia sp. A.T.C.C. 14559 and incubated for about 72 hours at a temperature of about 25°. The resultant mixture is maintained at about 25° for approximately 25 hours, during which time a stream of sterile air is passed through at a rate of about 10,000 parts by volume per minute and the developing culture is agitated to produce submerged growth. A solution of 6 parts of 3β-acetoxy-12a-aza-17α-hydroxy - C - homo-5α-pregnane-12,20-dione (U.S. 2,806,029) in 250 parts of acetone is then introduced, whereupon agitation with aeration at about 25° is resumed for 21 hours, at the end of which time the mixture is extracted with dichloromethane. The dichloromethane extract is stripped of solvent by vacuum distillation; and the residue is chromatographed on silica gel, using benzene and ethyl acetate in increasing proportions of the latter as developing solvent. From an eluate comprising solely ethyl acetate as the solvent there is obtained, on distillation of the ethyl acetate, a residue which, crystallized from 4 volumes of methanol, affords 12a-aza-17α-hydroxy-C-homopregna - 1,4 - diene-3,12,20-trione melting at 260–262° and having a specific rotation of +46° at a temperature of 23° and a concentration of 1% in chloroform solution. The product has the formula

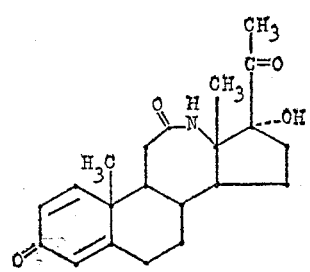

EXAMPLE 4

*17β - acetoxy-12a-aza-C-homoandrosta-1,4-diene-3,12-dione.*—To a solution of 4 parts of 12a-aza-C-homopregna-1,4-diene-3,12,20-trione in approximately 107 parts of dichloromethane at −30° is added 5 volumes of a 65% solution of pertrifluoroacetic acid in trifluoroacetic acid.

The resultant mixture is let stand at −5° for 16 hours and then washed successively with aqueous 10% sodium sulfate, aqueous 5% sodium bisulfite, aqueous 5% potassium bicarbonate, and aqueous 10% sodium sulfate. It is then dried over anhydrous sodium sulfate and stripped of solvent by vacuum distillation. The residue is the desired 17β-acetoxy-12a-aza-C-homoandrosta - 1,4 - diene-3,12-dione, having the formula

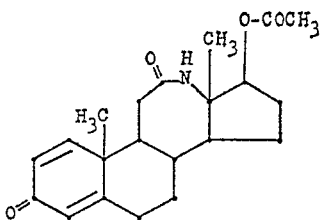

EXAMPLE 5

*12a - aza-17β-hydroxy-C-homoandrosta-1,4-diene-3,12-dione.*—A solution of 1 part of 17β-acetoxy-12a-aza-C-homoandrosta-1,4-diene-3,12-dione in 50 volumes of a 10% solution of potassium bicarbonate in aqueous 57% methanol is heated at the boiling point under reflux for 6 hours. The resultant solution is concentrated by vacuum distillation to approximately one-tenth its original volume, and the concentrate is extracted with ethyl acetate. The ethyl acetate extract is dried over anhydrous sodium sulfate and freed of solvent by distillation. The residue is 12a-aza-17β-hydroxy-C-homoandrosta - 1,4 - diene-3,12-dione, which is further purified by chromatography on silica gel, using benzene and ethyl acetate as developing solvents. The product has the formula

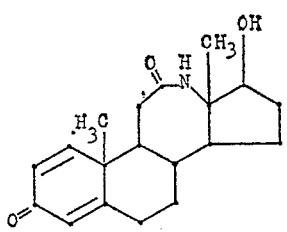

EXAMPLE 6

*21-acetoxy-12a-aza - 17α - hydroxy-C-homopregna-1,4-diene-3,12,20-trione.*—To a solution of 22 parts of 12a-aza-17α-hydroxy-C-homopregna-1,4 - diene-3,12,20-trione in a mixture of 150 parts of tetrahydrofuran and 136 parts of methanol is added 34 parts of powdered calcium oxide and 1 part of azobisisobutyronitrile. The resultant mixture is maintained with vigorous agitation at 25° while a solution of 22 parts of iodine in a mixture of 96 parts of tetrahydrofuran and 56 parts of methanol is introduced. It is then diluted with 900 parts of ethyl acetate and 700 parts of ether and filtered. The filtrate is washed successively with aqueous 10% sodium sulfate, aqueous 10% sodium thiosulfate, and aqueous 10% sodium sulfate, whereupon it is dried over anhydrous sodium sulfate and stripped of solvent by distillation. The residue is taken up in a mixture of 240 parts of acetone, 100 parts of acetic acid, and 114 parts of triethylamine. The solution thus obtained is heated at the boiling point under reflux for 1 hour and then mixed with 2000 parts of water. The resultant mixture is extracted with ethyl acetate. The ethyl acetate extract is washed successively with aqueous 10% sodium sulfate, aqueous 5% potassium bicarbonate, and aqueous 10% sodium sulfate, then dried over anhydrous sodium sulfate and stripped of solvent by distillation. The residue, further purified by chromatography on silica gel, using benzene and ethyl acetate as developing solvents, is 21-acetoxy-12a-azo-17α-hydroxy-C-homopregna-1,4-diene-3,12,20-trione, having the formula

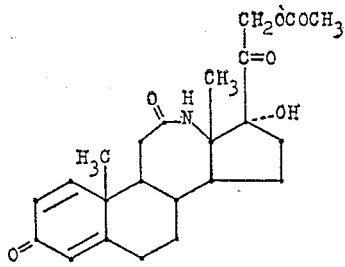

EXAMPLE 7

*12a-aza-17α,21-dihydroxy - C - homopregna-1,4-diene-3,12,20-trione.*—A solution of 83 parts of 21-acetoxy-12a-aza-17α-hydroxy-C-homopregna-1,4-diene-3,12,20 - trione in a solution of approximately 11 parts of sodium methoxide in 1580 parts of methanol is allowed to stand at room temperature for 3 minutes under an atmosphere of nitrogen and then diluted with 11 parts of water. The resultant solution is allowed to stand for 3 minutes at room temperature and then freed of methanol by vacuum distillation at room temperatures. The residue is triturated with water and insoluble solids separated by filtration. The solid material thus isolated, upon crystallization from methanol, affords 12a-azo-17α,21-dihydroxy-C-homopregna-1,4-diene-3,12,20-trione, having the formula

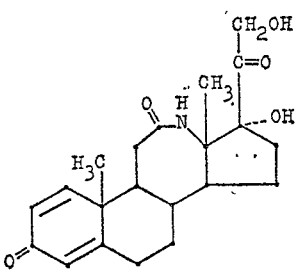

What is claimed is:
1. A compound of the formula

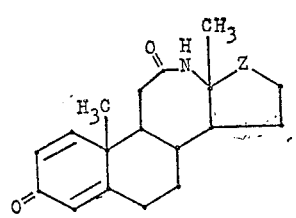

wherein Z is selected from the group consisting of the β-hydroxymethylene radical, β-(lower alkanoyloxy)-methylene radicals, and radicals of the formula

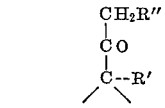

in which R' is selected from the group consisting of hydrogen and hydroxyl and R" is hydrogen when R' is hydrogen and is selected from the group consisting of hydrogen, hydroxyl, and lower alkanoyloxy radicals when R' is hydroxyl.

2. 12a-aza-C-homopregna-1,4-diene-2,12,20-trione.
3. 12a-aza-17α-hydroxy-C - homopregna - 1,4 - diene-3,12,20-trione.
4. 12a-aza-17β-hydroxy-C-homoandrosta - 1,4 - diene-3,12-dione.
5. 12a-aza-17α,21 - dihydroxy - C - homopregna-1,4-diene-3,12,20-trione.
6. 12a-aza-C-homo-5α-pregn-1-ene-3,12,20-trione.

References Cited in the file of this patent

UNITED STATES PATENTS

| 2,806,028 | Mazur | Sept. 10, 1957 |
| 2,806,029 | Mazur | Sept. 10, 1957 |

FOREIGN PATENTS

| 815,692 | Great Britain | July 1, 1959 |

OTHER REFERENCES

Fieser et al.: "Steroids," pages 689–90 (1959) (Reinhold).

UNITED STATES PATENT OFFICE

CERTIFICATE OF CORRECTION

Patent No. 3,143,543
August 4, 1964
Robert H. Mazur

It is hereby certified that error appears in the above numbered patent requiring correction and that the said Letters Patent should read as corrected below.

Column 6, lines 2 and 33, for "12a-azo-", each occurrence, read -- 12a-aza- --; column 7, line 4, for "2,12,20-" read -- 3,12,20- --.

Signed and sealed this 1st day of December 1964.

(SEAL)
Attest:

ERNEST W. SWIDER
Attesting Officer

EDWARD J. BRENNER
Commissioner of Patents